United States Patent Office 2,849,441
Patented Aug. 26, 1958

2,849,441

PRODUCTION OF ORGANIC ACID ESTERS OF CELLULOSE

Henry W. Steinmann, Madison, N. J., assignor to Celanese Corporation of America, New York, N. Y., a corporation of Delaware No Drawing. Application July 16, 1954
Serial No. 443,957

23 Claims. (Cl. 260—230)

In the manufacture of organic acid esters of cellulose, such as cellulose acetate, for example, by the homogeneous or solution process, cellulose is esterified with acetic anhydride in the presence of an esterification catalyst, such as sulfuric acid, perchloric acid, or the like, and a solvent for the cellulose acetate, such as acetic acid, methylene chloride, or the like. As the esterification proceeds, the cellulose acetate formed will dissolve in the solvent so that when the esterification is complete there will be obtained a substantially homogeneous esterification solution. This solution may be treated to ripen, or partially hydrolyze the cellulose acetate when it is desired to reduce the acetyl value of the product and also to improve the stability of the cellulose acetate by splitting off any sulfate or other sulfur containing groups where sulfuric acid has been used as a catalyst. Following this treatment, the cellulose acetate is precipitated by diluting the esterification solution with water. The precipitated cellulose acetate is then washed and dried. For the manufacture of filaments, films and the like, the cellulose acetate obtained in this manner is dissolved in a solvent or solvent mixture to form a spinning solution or dope which is forced through a shaping means such as a spinnerette, a die or the like, into a coagulating or setting medium where the solvent is removed. It will be evident that although in practicing this process the cellulose acetate is initially prepared in the form of a solution and is finally used in the form of a solution, it must be precipitated from the esterification solution and washed and dried before it is redissolved to form the spinning solution. The need for precipitating, washing, drying and redissolving the cellulose acetate appreciably increases the cost of manufacturing products therefrom.

It is an important object of this invention to provide a process for the manufacture of organic acid esters of cellulose by the homogeneous or solution process which will be free from the foregoing and other disadvantages.

Another object of this invention is to provide a process for the manufacture of organic acid esters of cellulose by the homogeneous or solution process in which a solution suitable for spinning may be obtained directly without any intermediate precipitation of the organic acid ester of cellulose.

Other objects of this invention will be apparent from the following detailed description and claims.

According to the present invention, organic acid esters of cellulose are prepared by esterifying cellulose with an organic acid anhydride in the presence of a water-immiscible solvent for the organic acid ester of cellulose being formed. At the completion of the esterification there is obtained a substantially homogeneous esterification solution. This solution may then be treated to ripen or partially hydrolyze the organic acid ester of cellulose, if desired. The esterification solution is then extracted with an aqueous medium under such conditions that two phases are present and no precipitation of the organic acid ester of cellulose from the solution takes place. The organic acid ester of cellulose solution obtained after the extraction is complete may be used directly for spinning. However, it is usually desirable to remove from the said solution at least some of the water which remains therein, as by distillation or with a drying agent. The solution may also be concentrated by distilling or otherwise removing a portion of the solvent therefrom. In some cases, it may be desirable to add other solvent materials to the solution to improve the spinning properties thereof. By operating according to this process, it is possible to obtain a spinning solution without the necessity of precipitating the organic acid ester of cellulose. As a result, the cost involved in preparing such spinning solutions is considerably reduced.

Prior to carrying out the esterification the cellulose may advantageously be pretreated, according to the usual practice in the art, to increase its reactivity and thereby shorten the esterification time. Such pretreatment may be effected by adding to the cellulose small quantities of a lower aliphatic acid such as, for example, formic acid, acetic acid, propionic acid or butyric acid as well as mixtures thereof. There may also be added to the cellulose during the pretreatment all or a portion of the esterification catalyst. The pretreatment of the cellulose may be carried out in a single stage, or in a plurality of stages, all as well known in the art.

The pretreated cellulose is then esterified with an organic acid anhydride corresponding to the organic acid ester of cellulose being formed in the presence of a water-immiscible solvent for the said ester. Suitable water-immiscible solvents for this purpose include, for example, nitromethane, m-cresol, cyclopentanone, pyrrole and furfural. Chlorinated hydrocarbon solvents such as methylene chloride, tetrachloroethane, trichloroethane, trichloroethanol and chloroform may also be employed for this purpose. Extremely valuable results are obtained when methylene chloride is employed as the solvent since it yields solutions that are especially well suited for spinning. Instead of employing a single material as the solvent, a mixture of materials, such as those specified above, may be used for this purpose. The quantity of solvent may range from the minimum necessary to dissolve the organic acid ester of cellulose being formed to any desired maximum. The use of excessively large quantities of solvent is, however, economically undesirable since it involves an added expense in recovering the solvent. When methylene chloride is employed as the solvent, good results have been obtained with from about 700 to 1400 parts by weight of methylene chloride for each 100 parts by weight of cellulose. The quantity of organic acid anhydride is not critical, good results having been obtained with from about 2.4 to 3.2 moles of organic acid anhydride for each 100 parts by weight of cellulose. The quantity of organic acid anhydride specified is in excess of that required to react with any water which may be introduced into the esterification mixture with the cellulose, the pretreating agent, the water-immiscible solvent or by any other source.

The esterification is normally carried out in the presence of an esterification catalyst, which may, for example, be sulfuric acid, perchloric acid, anhydrous ferric chloride, or aromatic and alkyl sulfonic acids. The quantity of such catalyst may range from as little as about 0.5% by weight, or less, to as much as about 5% by weight, or even more, based on the weight of the cellulose, with smaller quantities of catalyst requiring longer reaction times and larger quantities of catalyst requiring shorter reaction times. The esterification reaction is normally carried out at temperatures of between about 0 to 50° C.

As the esterification proceeds, the organic acid ester of cellulose being formed will dissolve in the esterification mixture so that at the end of the esterification there will be obtained a substantially homogeneous solution. This solution will contain, in addition to the organic acid ester of cellulose and the water-immiscible solvent therefor, the esterification catalyst, the unreacted organic acid anhydride and a certain proportion of organic acid. The organic acid is derived from a number of sources including the pretreatment acid, the organic acid that is formed by the reaction of the organic acid anhydride with any water that is present in the esterification mixture, the organic acid that is formed by the esterification reaction and any organic acid that is initially present in the organic acid anhydride.

For many purposes, it is desirable to ripen or partially hydrolyze the organic acid ester of cellulose to increase the average number of free hydroxyl groups per anhydroglucose unit in the cellulose molecule. Such ripening may be readily carried out by adding sufficient water to the solution to convert any remaining organic acid anhydride to the corresponding acid, together with an excess of water which may range from about 50 to 100 parts by weight for each 100 parts by weight of cellulose. Following the addition of the water, the solution is held, preferably with agitation, until the desired degree of hydrolysis has taken place. The temperature of the solution may be raised to increase the speed of the ripening process. It may also be desirable in some cases to add a quantity of a mineral acid to the solution to accelerate the ripening, or it may be desirable to neutralize all or a portion of the mineral acid esterfication catalyst to slow down the ripening. The addition of further quantities of mineral acid to thhe ripening solution or the neutralization of all or a portion of the mineral acid catalyst therein may be effected at the beginning of the ripening process or after the ripening has proceeded to some extent. After the ripening is complete, an alkaline material may be added to the solution to neutralize a portion or all of the mineral acid present therein, or an excess of an alkaline material may be added to the solution.

The solution of organic acid ester of cellulose obtained at the end of the esterification or after ripening where ripening is desirable, is then subjected to a two-phase extraction with an aqueous medium to remove therefrom the organic acids, esterification catalysts, salts and other water-soluble substances present therein. During the extraction, the proportion of water-immiscible solvent should be sufficiently high so that no precipitation of the organic acid ester of cellulose from solution will take place. The solution does develop a cloudy appearance during the extraction with an aqueous medium which cloudiness is probably due to the formation of an emulsion. However, since there is no separation of the organic acid ester of cellulose from the emulsion, it will hereinafter also be referred to as a solution.

The necessary proportion of water-immiscible solvent will depend, among other things, on the concentration of the organic acid ester of cellulose, the amount of organic acid present, the concentration of catalyst and salts, and the temperature of the solution. For any given set of conditions, the necessary proportion of water-immiscible solvent may be readily ascertained. In some cases, the amount of water-immiscible solvent necessary to avoid precipitation during the extraction may be present in the esterification solution from the very outset. However, this may, in some cases greatly increase the dilution of the esterification solution above that required for the esterification itself and thereby reduce the quantity of organic acid ester of cellulose that can be prepared in a reactor of given volume. In such cases, it may be desirable to carry on the esterification in the presence of a smaller amount of water-immiscible solvent and then add to the esterification solution, before or after ripening the same, a further quantity of water-immiscible solvent before extracting the solution with an aqueous medium. The addition of a further quantity of water-immiscible solvent also reduces the viscosity of the solution whereby it may be handled more easily and whereby the extraction will proceed more rapidly. When the extraction is carried out without first ripening the organic acid ester of cellulose, the esterification solution will normally have present therein a certain proportion of organic acid anhydride. At the beginning of the extraction this organic acid anhydride will be converted to the corresponding organic acid by reaction with the extraction water brought into contract with the esterification solution.

The aqueous medium employed for the extraction may be water itself. There may also be used a mixture of water and a water-miscible solvent or partially water-miscible solvent such as methanol, ethanol, normal propanol, isopropanol, ethyl acetate, pyridine, acetone and methyl acetate. The addition of the water-miscible solvent offers the advantage that the extraction proceeds more rapidly than when water alone is used as the extractant. However, in this case, the organic acid ester of cellulose solution obtained will contain a certain proportion of the water-miscible solvent which may be undesirable.

The extraction of the esterification solution may be carried out on a batch basis by mixing the said solution with an aqueous medium, permitting the solution to stand whereby it will separate into two phases, and then separating the two phases from contact with each other. This sequence of steps is then repeated as many times as necessary to remove from the esterification solution the water-soluble impurities present therein. Preferably, however, the extraction is carried out in a continuous manner. For example, the esterification solution may be passed through one or more extraction columns into which one or more streams of aqueous medium is introduced and through which the aqueous medium flows co-current with or countercurrent to the esterification solution. During the extraction the water-soluble impurities that are present in the esterification solution, including organic acids, esterification catalysts and salts, dissolve in the water and are thereby effectively removed from the said esterification solution.

At the end of the extraction step there is obtained a solution of the organic acid ester of cellulose in the water-immiscible solvent which is free from water-soluble impurities, but which is saturated with water. This solution may be used without further treatment for spinning or other purposes. However, it is preferred to remove from this solution at least a portion of the water present therein, for example, by distilling the same or through the use of a dehydrating agent. With many of the water-immiscible solvents, such as methylene chloride, there will distill over an azeotrope of water and the water-immiscible solvent. It will also usually be desirable to remove a portion of the water-immiscible solvent from the organic acid ester of cellulose solution to increase the concentration of the said solution so that it will be better suited for spinning operations. The removal of a portion of the solvent may be effected without difficulty by distilling the solvent from the solution. In some cases, it may, on the other hand, be preferred to add a further quantity of solvent to the solution to reduce the concentration of the organic acid ester of cellulose therein. The spinning properties of the solution may also be improved by adding thereto a proportion of a second and different solvent. For example, when methylene chloride is the water-immiscible solvent, the spinning properties of the solution may be improved by adding thereto a lower aliphatic alcohol such as methanol, ethanol, normal propanol or isopropanol. There may also be added to the solution pigments, dyes, plasticizers, fire-retardants and other materials capable of altering the appearance or properties of the final products.

It may also be desirable to treat the solution with a decolorizing agent such as activated charcoal, diatomaceous earth or fuller's earth to remove therefrom color-producing materials. The solution may also be filtered to remove particles therefrom such as bits of unacetylated cellulose, dirt and the like.

The solution of organic acid ester of cellulose obtained in this manner is well suited for spinning by conventional spinning techniques to form filaments, films and the like as well as for coatings and similar purposes. It is free from impurities that would interfere with the spinning operation or impair the properties of the products produced therefrom. Because no precipitation steps are involved in preparing the solutions, important economies can be achieved in such preparation. The organic acid ester of cellulose may, if desired, also be precipitated from such solution by mixing the same with a large excess of a non-solvent for the organic acid ester of cellulose, in which case there will be obtained a product which needs no further purification to prepare it for use.

The process of this invention is generally suited for the production of organic acid esters of cellulose, regardless of their degree of substitution. It is especially well suited for the production of organic acid esters of cellulose with complete esterification to give triesters or cellulose esters of varying degree of esterification having fewer than 0.6 free hydroxyl groups per anhydroglucose units in the cellulose molecule since it avoids the difficulties that are normally encountered in preparing such esters by the solution process.

The invention will now be described specifically in connection with the production of cellulose acetate which is commercially the most important organic acid ester of cellulose at the present time. However, it may also be employed for the production of other organic acid esters of cellulose including cellulose propionate, cellulose butyrate, cellulose acetate formate, cellulose acetate propionate, cellulose acetate butyrate and cellulose benzoate.

The following examples are given to illustrate this invention further.

Example I

To 60 parts by weight of wood pulp there is added 21 parts by weight of glacial acetic acid and the whole is stirred for 2 hours and cooled to 10° C. There is then added to the pretreated cellulose, an esterification mixture which has been cooled to 10° C. and contains 150 parts by weight of acetic anhydride and 826 parts by weight of methylene chloride, to which esterification mixture there has been added, in the form of a 2% by weight solution in acetic acid, 0.5% by weight, based on the weight of the wood pulp, of perchloric acid as esterification catalyst. The temperature of the reaction increases over a period of 35 minutes to a peak of 42° C. at which temperature the methylene chloride begins to boil. The methylene chloride vapors are condensed and returned to the reactor as reflux. The solution is held at the peak temperature for 5 minutes, following which 5 parts by weight of water is added thereto to react with the excess acetic anhydride and the catalyst is neutralized by the addition of 1.1 parts by weight of a 20% aqueous solution of magnesium acetate. The solution is stirred for one hour and is then introduced into the top of a packed column through which it flows downwardly. Simultaneously, water is introduced into the base of the column and flows upwardly therethrough overflowing from the top of the column in the form of a dilute aqueous acetic acid solution. After two passes through the column, the cellulose acetate solution which has a cloudy appearance is distilled so that there passes overhead an azeotrope of water and methylene chloride which is condensed and separates into two layers, an upper aqueous layer which is removed and a lower methylene chloride layer which is returned to the solution. After the major portion of the water has been removed the solution becomes clear. The solution is then filtered and sufficient methylene chloride is distilled therefrom in a vessel equipped with stirring meaning to bring its cellulose acetate concentration to 19.5% by weight based on the weight of the solvent. The solution is spun to form a multifilament yarn of satisfactory properties by conventional spinning techniques. On analysis, the cellulose acetate is found to have an acetyl value of 62.5 by weight calculated as acetic acid.

Example II

The process of Example I is repeated except that 689 parts by weight of methylene chloride are added to the cellulose acetate solution before it is extracted with water. The extraction proceeds more rapidly and with higher efficiency because of the lower viscosity of the cellulose acetate solution.

Example III

The process of Example I is repeated except that a mixture of methanol and water containing 10% by weight of methanol is employed as the extractant in place of water. The extraction proceeds more rapidly than when water alone is employed as the extractant. The final solution obtained in this case contains about 5% by weight of methanol.

It is to be understood that the foregoing detailed description is given merely by way of illustration and that many variations may be made therein without departing from the spirit of my invention.

Having described my invention, what I desire to secure by Letters Patent is:

1. In a process for the production of organic acid esters of cellulose, the steps which comprise esterifying cellulose with an organic acid anhydride of a water-soluble acid in the presence of a water-immiscible solvent for the ester being formed whereby there will be obtained at the completion of the esterification a substantially homogeneous solution, and subjecting the solution to a two phase extraction with an aqueous medium to remove substantially all the water-soluble acid and other water-soluble materials therefrom, there being present during the extraction a sufficient proportion of water-immiscible solvent to prevent precipitation of the organic acid ester of cellulose from the solution.

2. In a process for the production of organic acid esters of cellulose, the steps which comprise esterifying cellulose with an organic acid anhydride of a water-soluble acid in the presence of a water-immiscible solvent for the ester being formed whereby there will be obtained at the completion of the esterification a substantially homogeneous solution, ripening the organic acid ester of cellulose in the solution, and subjecting the solution to a two phase extraction with an aqueous medium to remove substantially all the water-soluble acid and other water soluble materials therefrom, there being present during the extraction a sufficient proportion of water-immiscible solvent to prevent precipitation of the organic acid ester of cellulose from the solution.

3. In a process for the production of organic acid esters of cellulose, the steps which comprise esterifying cellulose with an organic acid anhydride of a water-soluble acid in the presence of a water-immiscible solvent for the ester being formed whereby there will be obtained at the completion of the esterification a substantially homogeneous solution, subjecting the solution to a two phase extraction with an aqueous medium to remove substantially all the water-soluble acid and other water soluble materials therefrom there being present during the extraction a sufficient proportion of water-immiscible solvent to prevent precipitation of the organic acid ester of cellulose from the solution, and removing at least a portion of water present in the extracted solution without precipitating the organic acid ester of cellulose from solution.

4. In a process for the production of organic acid esters of cellulose, the steps which comprise esterifying cellulose with an organic acid anhydride of a water-soluble acid in the presence of a water-immiscible solvent for the ester being formed whereby there will be obtained at the completion of the esterification a substantially homogeneous solution, subjecting the solution to a two phase extraction with an aqueous medium to remove substantially all the water-soluble acid and other water soluble materials therefrom there being present during the extraction a sufficient proportion of water-immiscible solvent to prevent precipitation of the organic acid ester of cellulose from the solution, removing at least a portion of the water present in the extracted solution, and removing a portion of the water-immiscible solvent from the solution to increase the concentration of the solution all without precipitating the organic acid ester of cellulose from solution.

5. In a process for the production of organic acid esters of cellulose, the steps which comprise esterifying cellulose with an organic acid anhydride of a water-soluble acid in the presence of a water-immiscible solvent for the ester being formed whereby there will be obtained at the completion of the esterification a substantially homogeneous solution, ripening the organic acid ester of cellulose in the solution, subjecting the solution to a two phase extraction with an aqueous medium to remove substantially all the water-soluble acid and other water soluble materials therefrom, there being present during the extraction a sufficient proportion of water-immiscible solvent to prevent precipitation of the organic acid ester of cellulose from the solution, removing at least a portion of the water present in the extracted solution, and removing a portion of the water-immiscible solvent from the solution to increase the concentration of the solution all without precipitating the organic acid ester of cellulose from solution.

6. In a process for the production of organic acid esters of cellulose, the steps which comprise esterifying cellulose with an organic acid anhydride of a water-soluble acid in the presence of methylene chloride and perchloric acid as an esterification catalyst whereby there will be obtained at the completion of the esterification a substantially homogeneous solution, and subjecting the solution to a two phase extraction with an aqueous medium to remove substantially all the water-soluble acid and other water soluble materials therefrom, there being present during the extraction a sufficient proportion of methylene chloride to prevent precipitation of the organic acid ester of cellulose from the solution.

7. In a process for the production of organic acid esters of cellulose, the steps which comprise esterifying cellulose with an organic acid anhydride of a water-soluble acid in the presence of methylene chloride whereby there will be obtained at the completion of the esterification a substantially homogeneous solution, subjecting the solution to a two phase extraction with an aqueous medium to remove substantially all the water-soluble acid and other water soluble materials therefrom, there being present during the extraction a sufficient proportion of methylene chloride to prevent precipitation of the organic acid ester of cellulose from the solution, and removing at least a portion of the water present in the extracted solution by distilling the solution whereby an azeotrope of water and methylene chloride will distill overhead without precipitating the organic acid ester of cellulose from solution.

8. In a process for the production of organic acid esters of cellulose, the steps which comprise esterifying cellulose with on organic acid anhydride of a water-soluble acid in the presence of methylene chloride whereby there will be obtained at the completion of the esterification a substantially homogeneous solution, subjecting the solution to a two phase extraction with an aqueous medium to remove substantially all the water-soluble acid and other water soluble materials therefrom, there being present during the extraction a sufficient proportion of methylene chloride to prevent precipitation of the organic acid ester of cellulose from the solution, removing at least a portion of the water present in the extracted solution by distilling the solution whereby an azeotrope of water and methylene chloride will distill overhead, and distilling a portion of the methylene chloride from the solution to increase the concentration of the solution all without precipitating the organic acid ester of cellulose from solution.

9. In a process for the production of cellulose acetate, the steps which comprise esterifying cellulose with acetic anhydride in the presence of a water-immiscible solvent for the cellulose acetate whereby there will be obtained at the completion of the esterification a substantially homogeneous solution, and subjecting the solution to a two-phase extraction with an aqueous medium to remove substantially all the acetic acid and other water soluble materials therefrom, there being present during the extraction a sufficient proportion of water-immiscible solvent to prevent precipitation of the cellulose acetate from the solution.

10. The process set forth in claim 9, wherein the esterification is conducted in the presence of perchloric acid as esterification catalyst.

11. In a process for the production of cellulose acetate, the steps which comprise esterifying cellulose with acetic anhydride in the presence of a water-immiscible solvent for the cellulose acetate whereby there will be obtained at the completion of the esterification a substantially homogeneous solution, ripening the cellulose acetate in the solution, and subjecting the solution to a two-phase extraction with an aqueous medium to remove substantially all the acetic acid and other water soluble materials therefrom, there being present during the extraction a sufficient proportion of water-immiscible solvent to prevent precipitation of the cellulose acetate from the solution.

12. In a process for the production of cellulose acetate, the steps which comprise esterifying cellulose with acetic anhydride in the presence of a water-immiscible solvent for the cellulose acetate whereby there will be obtained at the completion of the esterification a substantially homogeneous solution, subjecting the solution to a two-phase extraction with an aqueous medium to remove substantially all the acetic acid and other water soluble materials therefrom, there being present during the extraction a sufficient proportion of water-immiscible solvent to prevent precipitation of the cellulose acetate from the solution, and removing at least a portion of the water present in the extracted solution without precipitating the cellulose acetate from solution.

13. In a process for the production of cellulose acetate, the steps which comprise esterifying cellulose with acetic anhydride in the presence of a water-immiscible solvent for the cellulose acetate whereby there will be obtained at the completion of the esterification a substantially homogeneous solution, subjecting the solution to a two-phase extraction with an aqueous medium to remove substantially all the acetic acid and other water soluble materials therefrom, there being present during the extraction a sufficient proportion of water-immiscible solvent to prevent precipitation of the cellulose acetate from the solution, removing at least a portion of the water present in the extracted solution, and removing a portion of the water-immiscible solvent from the solution to increase the concentration of the solution all without precipitating the cellulose acetate from solution.

14. In a process for the production of cellulose acetate, the steps which comprise esterifying cellulose with acetic anhydride in the presence of a water-immiscible solvent for the cellulose acetate whereby there will be obtained at the completion of the esterification a substantially homogeneous solution, ripening the cellulose acetate in the solution, subjecting the solution to a two-phase extraction with an aqueous medium to remove substantially all the acetic acid and other water soluble materials therefrom, there being present during the extraction a sufficient proportion of water-immiscible solvent to prevent precipitation of the cellulose acetate from the solution, removing at least a portion of the water present in the extracted solution, and removing a portion of the water-immiscible solvent from the solution to increase the concentration of the solution all without precipitating the cellulose acetate from solution.

15. In a process for the production of cellulose acetate, the steps which comprise esterifying cellulose with acetic anhydride in the presence of methylene chloride whereby there will be obtained at the completion of the esterification a substantially homogeneous solution, and subjecting the solution to a two-phase extraction with an aqueous medium to remove substantially all the acetic acid and other water soluble materials therefrom, there being present during the extraction a sufficient proportion of methylene chloride to prevent precipitation of the cellulose acetate from the solution.

16. In a process for the production of cellulose acetate, the steps which comprise esterifying cellulose with acetic anhydride in the presence of methylene chloride whereby there will be obtained at the completion of the esterification a substantially homogeneous solution, subjecting the solution to a two-phase extraction with an aqueous medium to remove substantially all the acetic acid and other water soluble materials therefrom, there being present during the extraction a sufficient proportion of methylene chloride to prevent precipitation of the cellulose acetate from the solution, and removing at least a portion of the water present in the extracted solution without precipitating the cellulose acetate from solution.

17. In a process for the production of cellulose acetate, the steps which comprise esterifying cellulose with acetic anhydride in the presence of methylene chloride whereby there will be obtained at the completion of the esterification a substantially homogeneous solution, subjecting the solution to a two-phase extraction with an aqueous medium to remove substantially all the acetic acid and other water soluble materials therefrom, there being present during the extraction a sufficient proportion of methylene chloride to prevent precipitation of the cellulose acetate from the solution, removing at least a portion of the water present in the extracted solution by distilling the solution whereby an azeotrope of water and methylene chloride will distill overhead, and distilling a portion of the methylene chloride from the solution to increase the concentration of the solution all without precipitating the cellulose acetate from solution.

18. In a process for the production of cellulose acetate, the steps which comprise esterifying cellulose with acetic anhydride in the presence of an esterification catalyst and methylene chloride whereby there will be obtained at the completion of the esterification a substantially homogeneous solution, subjecting the solution to a two-phase extraction with an aqueous medium to remove substantially all the acetic acid and other water soluble materials therefrom, there being present during the extraction a sufficient proportion of methylene chloride to prevent precipitation of the cellulose acetate from the solution, removing at least a portion of the water present in the extracted solution by distilling the solution whereby an azeotrope of water and methylene chloride will distill overhead, and distilling a portion of the methylene chloride from the solution to increase the concentration of the solution all without precipitating the cellulose acetate from solution, and shaping the solution without any intermediate precipitation of the cellulose acetate from solution, 19. In a process for the production of cellulose acetate, the steps which comprise pretreating cellulose, esterifying the pretreated cellulose with acetic anhydride in the presence of an esterification catalyst and methylene chloride whereby there will be obtained at the completion of the esterification a substantially homogeneous solution, subjecting the solution to a two-phase extraction with an aqueous medium to remove substantially all the acetic acid and other water soluble materials therefrom, there being present during the extraction a sufficient proportion of methylene chloride to prevent precipitation of the cellulose acetate from the solution, removing at least a portion of the water present in the extracted solution by distilling the solution whereby an azeotrope of water and methylene chloride will distill overhead, and distilling a portion of the methylene chloride from the solution to increase the concentration of the solution all without precipitating the cellulose acetate from solution.

20. In a process for the production of organic acid esters of cellulose, the steps which comprise subjecting a solution of an organic acid ester of cellulose in a water-immiscible solvent containing the organic acid of said ester to a two-phase extraction with an aqueous medium whereby substantially all the water-soluble acid and other water soluble materials are removed from said solution, there being present during the extraction a sufficient proportion of water-immiscible solvent to prevent precipitation of the organic acid ester of cellulose solution.

21. In a process for the production of cellulose acetate, the steps which comprises subjecting a solution of cellulose acetate in a water-immiscible solvent containing acetic acid to a two-phase extraction with an aqueous medium whereby substantially all the acetic acid and other water soluble materials are removed from said solution, there being present during the extraction a sufficient proportion of water-immiscible solvent to prevent precipitation of the cellulose acetate from the solution.

22. In a process for the production of organic acid esters of cellulose, the steps which comprise esterifying cellulose with an organic acid anhydride of a water-soluble acid in the presence of a water-immiscible solvent for the ester being formed whereby there will be obtained at the completion of the esterification a substantially homogeneous solution, subjecting the solution to a two phase extraction with an aqueous medium to remove substantially all the water-soluble acid and other water-soluble materials therefrom, there being present during the extraction a sufficient proportion of water-immiscible solvent to prevent precipitation of the organic acid ester of cellulose from the solution, and spinning the solution without any intermediate precipitation of the organic acid ester of cellulose from solution.

23. In a process for the production of organic acid esters of cellulose, the steps which comprise subjecting a solution of an organic acid ester of cellulose in a water-immiscible solvent containing the organic acid of said ester to a two-phase extraction with an aqueous medium whereby substantially all the water-soluble acid and other water-soluble materials are removed from said solution, there being present during the extraction a sufficient proportion of water-immiscible solvent to prevent precipitation of the organic acid ester of cellulose solution, and spinning the solution without any intermediate precipitation of the organic acid ester of cellulose from solution.

References Cited in the file of this patent
UNITED STATES PATENTS

| 1,919,002 | Whitehead | July 18, 1933 |
| 2,126,190 | Hofmann | Aug. 9, 1938 |
| 2,214,943 | Tinsley | Sept. 17, 1940 |
| 2,265,528 | Hofmann et al. | Dec. 9, 1941 |

OTHER REFERENCES

"Technique of Organic Chemistry," vol. III, 1950, Interscience Publishers, Inc. (N. Y.), pp. 172 and 173.